United States Patent

Tsujimoto et al.

[11] Patent Number: 6,013,729
[45] Date of Patent: Jan. 11, 2000

[54] ELASTOMER COMPOSITIONS AND PROCESSES FOR PRODUCING THE SAME

[75] Inventors: Motoyoshi Tsujimoto; Tsuyoshi Iwasa, both of Hyogo, Japan

[73] Assignee: Sumitomo Bakelite Co., Ltd., Tokyo, Japan

[21] Appl. No.: 09/051,117

[22] PCT Filed: Oct. 9, 1996

[86] PCT No.: PCT/JP96/02928

§ 371 Date: Apr. 1, 1998

§ 102(e) Date: Apr. 1, 1998

[87] PCT Pub. No.: WO97/13806

PCT Pub. Date: Apr. 17, 1997

[30] Foreign Application Priority Data

Oct. 12, 1995 [JP] Japan .................................. 7-264280

[51] Int. Cl.$^7$ ...................................................... C08F 8/00
[52] U.S. Cl. ............................................................ 525/105
[58] Field of Search ............................................. 525/105

[56] References Cited

U.S. PATENT DOCUMENTS

| | | |
|---|---|---|
| 4,500,688 | 2/1985 | Arkles . |
| 4,558,094 | 12/1985 | Deguchi et al. . |
| 4,803,244 | 2/1989 | Umpleby . |
| 4,970,263 | 11/1990 | Arkles et al. . |
| 5,597,867 | 1/1997 | Tsujimoto et al. .................... 525/74 |

FOREIGN PATENT DOCUMENTS

| | | |
|---|---|---|
| 324430 | 7/1989 | European Pat. Off. . |
| 53-21021 | 6/1978 | Japan . |
| 58-46138 | 10/1983 | Japan . |
| 61-34050 | 2/1986 | Japan . |
| 1-217053 | 8/1989 | Japan . |

*Primary Examiner*—Melvyn I. Marquis
*Assistant Examiner*—Mark W. Milstead
*Attorney, Agent, or Firm*—Smith, Gambrell & Russell, LLP

[57] ABSTRACT

There is disclosed a moisture-curable elastomer composition obtained by dynamic heat treatment of a mixture comprising (a) an ethylene-α-olefin-unconjugated diene copolymer rubber,
(b) a silicon-based crosslinking agent having two or more SiH groups within the molecule,
(c) a hydrosilylation catalyst and
(d) a hydrolyzable silane group-containing thermoplastic resin. Also disclosed is an elastomer composition resulting from molding of the above elastomer composition, followed by contacting with water, preferably in the presence of a silanol catalyst, to thereby cause crosslinking of the hydrolyzable silane group-containing thermoplastic resin. The elastomer composition of the present invention is excellent in rubber elasticity at high temperatures, low temperature impact resistance and oil resistance and have good moldability.

13 Claims, No Drawings

ELASTOMER COMPOSITIONS AND PROCESSES FOR PRODUCING THE SAME

TECHNICAL FIELD

The present invention relates to a novel postcurable, moisture-curable elastomer, a process for producing the same, and a molded elastomer composition having rubber elasticity as obtained after postcuring of said elastomer.

The moisture-curable elastomer of the present invention has good moldability and workability and gives, after postcuring, molded elastomers comparable in rubber elasticity and oil resistance to vulcanized rubbers over a wide temperature range.

BACKGROUND ART

In recent years, thermoplastic elastomers have been used as elastomers having rubber elasticity, requiring no curing, and having excellent moldability and workability like thermoplastic resins, in the fields of automotive parts, household electrical appliance parts, electric wire coverings, medical device parts, miscellaneous goods, footwear and so forth. As such thermoplastic elastomers, Japanese Kokai Tokkyo Koho S61-34050, for instance, describes thermoplastic elastomers containing a vinyl aromatic compound block (hard segment) and a conjugated diene compound block (soft segment) alternately in the copolymer chain. In the case of these thermoplastic elastomers, products meeting various specifications, ranging from those rich in flexibility to rigid ones, can be produced by varying the proportions of the two segments appropriately. However, those thermoplastic elastomer compositions containing the soft segment in large proportions are low in tensile strength, heat resistance, flowability and oil resistance and therefore cannot be used in a broad range of applications.

Further, compositions resulting from melt-kneading a monoolefin copolymer rubber and a polyolefin resin together with an organic peroxide as a rubber auxiliary crosslinking agent to thereby effect partial crosslinking are described in Japanese Patent Publication S53-21021, for instance.

Such thermoplastic elastomers in which the monoolefin copolymer rubber has been only partially crosslinked are not satisfactory enough in oil resistance, form recovery at high temperature, and other properties, and hence cannot be used in a sufficiently wide range of applications. The radicals formed from the organic peroxide used for crosslinking cause polymer chain cleavage, hence a reduction in mechanical strength.

Furthermore, it is described in Japanese Patent Publication S58-415138 that the monoolefin copolymer rubber alone is preferentially crosslinked using a heat-reactive alkilphenol resin as the crosslinking agent to thereby overcome the drawbacks mentioned above. Thus, there are described thermoplastic elastomers obtained by crosslinking the EPDM rubber component of a thermoplastic resin preferentially using a phenolic curing agent. The thermoplastic elastomers obtained by such a procedure in which the rubber component has been completely crosslinked show improved oil resistance and form recovery at high temperature but the improvements attainable are not satisfactory enough when compared with cured rubbers.

In U.S. Pat. No. 4,803,244, there are described thermoplastic elastomers obtained by crosslinking the rubber component comprising a monoolefin copolymer using an organosiloxane. However, the matrix components of the thermoplastic elastomers described there are polypropylene, polyethylene, ethylene-α-olefin copolymers and the like, hence the elastomer compositions show a low rate of recovery after compression. Even when a monoolefin copolymer having relatively good compatibility with the matrix components is used as the rubber component in said elastomer compositions, the dispersion of the rubber component is insufficient because of the poor compatibility of the crystalline fraction of the matrix. In particular, the state of dispersion worsens as the proportion of rubber increases, failing to give physical properties necessary for automotive parts, such as weather strips and dust boots, for which rubber elasticity is particularly needed.

U.S. Pat. Nos. 4,970,263 and 4,500,688 also describe thermoplastic resin compositions in which the rubber component has been crosslinked using an organosiloxane compound as the crosslinking agent. However, in the compositions described therein, a polyolefin or the like is used as the matrix, and the rate of recovery after compression at high temperature is low.

Further, Japanese Kokai Tokkyo Koho H01-236250 describes elastomer compositions in which a thermoplastic resin prepared by grafting a hydrolyzable silane to polyethylene or the like is used as the matrix, with rubber particles crosslinked with a curing agent incapable of curing the silane-grafted polymer, for example sulfur, being dispersed in said matrix. This literature describes only the curing using sulfur, isocyanates or the like and the technology fails to attain high-temperature, high-speed curing, and may possibly meet with the problem of sulfur bleeding. The range of application of the end products is thus limited.

Japanese Kokai Tokkyo Koho H01-217053 also describes elastomer compositions comprising a matrix composed of a hydrolyzable silane group-containing polyolefin resin and another polyolefin resin and a dispersed phase composed of a rubber. However, the rubber phase is phenol-crosslinked. There is no description of SiH crosslinking.

OBJECTS AND SUMMARY OF THE INVENTION

It is the primary object of the present invention to provide an elastomer composition which is comparable in rubber elasticity to cured rubbers, has excellent moldability and workability, is highly safe when used in various applications, and is excellent in long-term reliability with respect to performance characteristics, for example freedom from base polymer deterioration.

The present inventors have made various investigations concerning the technology of crosslinking the continuous phase and dispersed rubber phase of a thermoplastic elastomer composition. As a result, it was found that a moisture-curable elastomer composition comprising a thermoplastic resin having a postcurable, hydrolyzable silane group as the continuous phase with a rubber component: crosslinked with a specific crosslinking agent being powerfully dispersed therein and a silanol condensation catalyst being further incorporated therein exhibits, after molding, excellent characteristics resulting from crosslinking of the continuous phase Edith moisture. Based on such findings, the present invention has now been completed.

The present invention thus provides a moisture-curable elastomer composition obtained by dynamic heat treatment of a mixture of (a) an ethylene-α-olefin-unconjugated diene copolymer rubber, (b) a silicon type crosslinking agent having two or more SiH groups within the molecule, (c) a hydrosilylation catalyst and
(d) a hydrolyzable silane group-containing thermoplastic resin,
and a process for producing the same.

The present invention further provides an elastomer composition resulting from molding of said water-curable elastomer composition, followed by contacting with water, preferably in the presence of a silanol catalyst, for crosslinking the hydrolyzable silane group-containing thermoplastic resin, and a process for producing the same.

The elastomer composition of the present invention is preferably produced in particular by mixing 100 weight parts of an ethylene-α-olefin-unconjugated diene copolymer rubber, 10 to 120 weight parts of a hydrolyzable silane group-containing thermoplastic resin, 0.5 to 30 weight parts of a crosslinking agent and 0.001 to 5 weight parts of a hydrosilylation catalyst (crosslinking catalyst), heat treating the mixture dynamically, then adding 0.001 to 3 weight parts of a silanol condensation catalyst and, after melting and kneading, contacting the mixture with water to thereby effect crosslinking of the hydrolyzable silane group-containing thermoplastic resin.

The crosslinked elastomer composition obtained according to the present invention is thought to structurally comprise
(i) a matrix comprising a thermoplastic resin having hydrolyzable silane groups crosslinked by dehydration condensation of silanol groups and
(ii) a dispersed phase consisting of an ethylene-α-olefin-unconjugated diene copolymer rubber dispersed in said matrix and crosslinked.

DETAILED DISCLOSURE OF THE INVENTION
Dispersed Phase
(a) Rubber Component

The rubber component to be used in accordance with the present invention is an ethylene-α-olefin-unconjugated diene copolymer rubber.

The α-olefin is preferably one containing 3 to 15 carbon atoms. Preferred specific examples of the α-olefin are propylene, butene-1, pentene-1, octene-1, 4-methylpentene-4, 4-methylhexene-1, 4,4-dimethylpentene-1, nonene-1, decene-1, undecene-1, dodecene-1, 1-tridecene, 1-tetradecene, 1-pentadecene and the like. Among these, propylene is particularly preferred because of its ready availability and the good impact resistance of the resulting elastomer composition.

Preferred as the unconjugated diene are dicyclopentadiene (DCPD), 5-(2-methyl-2-butenyl)-2-norbornene (MBN), 5-methylene-2-norbornene (MNB), 5-ethylidene-2-norbornene (ENB), methyltetrahydroindene (MTHI) and 1,4-hexadiene (HD), among others. Among these, DCPD, ENB and HD are preferred because of their ready availability, and ENB, which enables introduction of a larger amount of diene, is most preferred.

Accordingly, the most preferred ethylene-α-olefin-unconjugated diene copolymer rubber to be used in the practice of the present invention is an ethylene-propylene-ethylidenenorbornene copolymer rubber.

For obtaining favorable rubber elasticity, the ethylene/α-olefin ratio in such a copolymer rubber is 50/50 to 90/10, more preferably 60/40 to 80/20, by weight. The rubber to be used in the present invention has a Mooney viscosity [$ML_{1+4}(125°\ C.)$] of 10 to 120, preferably 40 to 100. When the Mooney viscosity of the rubber is lower than 10, the molecular weight thereof is very small, so that the molecular weight of the crosslinked rubber becomes small and accordingly the permanent compression set tends to increase. On the other hand, when the Mooney viscosity exceeds 120, the moldability and workability decrease markedly; this is unfavorable. As such a rubber component, rubbers showing an apparent Mooney viscosity of not more than 120 as resulting from viscosity adjustment in advance by melt-kneading with a paraffinic oil (oil extension) are available on the market and these can be used as well. While the iodine value of the rubber is an index of reactivity and a higher value means higher activity, it is preferred that the rubber to be used in the present invention is a high activity rubber having an iodine value of 10 to 30, in particular 15 to 30.

(b) Rubber Crosslinking Agent and (c) Rubber Crosslinking Catalyst

The silicon type crosslinking agent (rubber crosslinking agent) having two or more SiH groups within the molecule and the hydrosilylation catalyst (rubber crosslinking catalyst) to be used in the present invention are added for the purpose of crosslinking the rubber component for the expression of rubber elasticity. The crosslinking catalyst is a catalyst to be used for inducing the crosslinking reaction of the rubber crosslinking agent, or a crosslinking auxiliary for promoting the crosslinking reaction. By using the crosslinking catalyst, the crosslinking reaction can proceed at a practical rate.

The crosslinking by the silicon type crosslinking agent having two or more SiH groups within the molecule utilizes the selective addition reaction (hydrosilylation catalyst), by means of the SiH groups, to the unsaturated hydrocarbon in the rubber component. The crosslinking agent to be used here is required to have two or more SiH groups per crosslinking agent molecule so that it can add to two or more rubber molecules.

As preferred examples of such a silicon type crosslinking agent, there may be mentioned compounds having an organosiloxane structure such as the cyclic organohydrogensiloxane (I), linear organohydrogensiloxane (II) or tetrahedral organohydrogensiloxane (III) structure shown below, and compounds derived therefrom. For increasing the crosslinking density of the rubber, it is preferred that the number of SiH groups in the silicon type crosslinking agent is as many as possible. Among these silicon type crosslinking agents, those linear polyorganohydrogensiloxanes (II) which have five or more SiH groups within the molecule are preferred. The number of SiH groups is more preferably 10 or more, and most preferably 15 or more. As further preferred crosslinking agents, there may be mentioned linear organohydrogensiloxanes constituted only of SiH-containing units, such as II-(2) and II-(4) shown below.

Cyclic organohydrogensiloxanes (I)

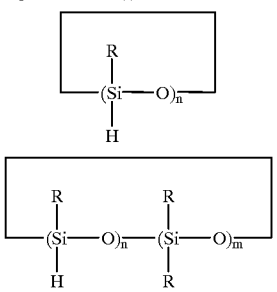

-continued

Linear organohydrogensiloxanes (II)

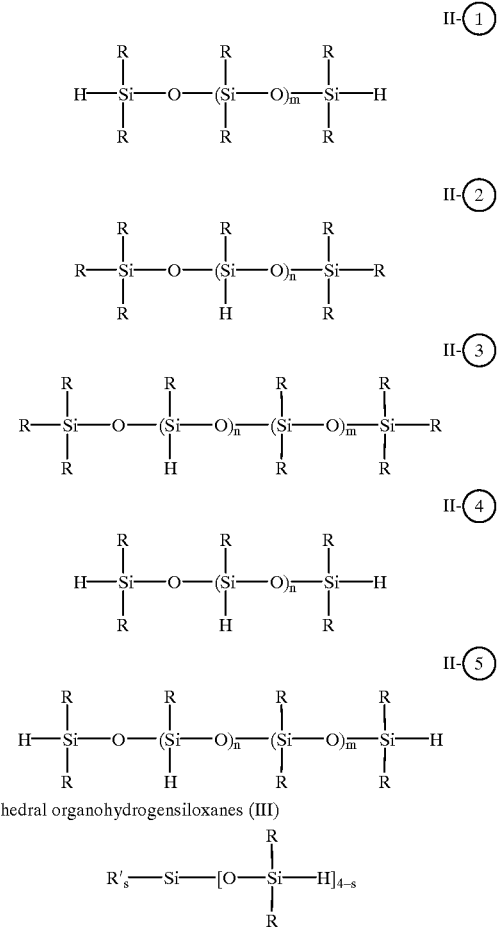

Tetrahedral organohydrogensiloxanes (III)

$$R'_s\text{—}Si\text{—}[O\text{—}\underset{\underset{R}{|}}{\overset{\overset{R}{|}}{Si}}\text{—}H]_{4-s}$$

In the above formulas, the R (R') groups represent one or more kinds of substituent and each is selected from among alkyl groups containing 1 to 24 carbon atoms, alkoxyl groups containing 1 to 24 carbon atoms, a phenyl group, aryl groups and aryloxy groups, and preferably is a methyl group. n varies from 2 to 100, preferably from 5 to 80, m varies from 1 to 100, and s is an integer of 0 to 2. The R substituents may be the same or different.

In producing the elastomer, the level of addition of the above-mentioned rubber crosslinking agent is 0.5 to 30 parts by weight, preferably 1 to 20 parts by weight, more preferecably 3 to 7 parts by weight, per 100 parts by weight of the rubber component. When the crosslinking agent is used at lower addition levels, sufficient curing may not be obtained and the rubber characteristics of the elastomer may be unsatisfactory in some instances. On the other hand, when the crosslinking agent is used at higher levels, the effect thereof increases little and, in some instances, the crosslinking agent may bleed out.

Next, the hydrosilylation catalyst (rubber crosslinking catalyst) is a catalyst for promoting the hydrosilylation reaction by the rubber crosslinking agent mentioned above and, as typical catalysts, there may be mentioned group VIII transition metals, such as palladium, rhodium and platinum, or compounds and complexes thereof, among others. More specifically, mention may be made of dichlorobis (acetonitrile)palladium(II), chlorotris(triphenylphosphine) rhodium(I), chloroplatinic acid and the like. Among these, platinum-based catalysts such as chloroplatinic acid and platinum-vinylsiloxane complex (Karstedt's catalyst) are preferably used.

In dispersing the hydrosilylation catalyst in the rubber, the method comprising dissolving it beforehand in a liquid component and using the solution for dispersion or the method comprising using it in a form supported on a solid component may be used. From the dispersibility and workability viewpoint, it is preferably used in a form supported by one or more of the solid components. As a specific example of such method, there may the mentioned the technique comprising dissolving the catalyst in an alcohol solvent or the like and then causing it to be supported on a solid component such as silica. As such a solid component, carriers having adsorptivity are used, for example inorganic fillers such as calcium carbonate, carbon black, talc, mica, barium sulfate, natural silicic acid, synthetic silicic acid (white carbon), and titanium oxide, among which synthetic silicic acid is preferably used. The catalysts supported on these carriers may be prepared by a per se known method.

The level of addition of the hydrosilylation catalyst is 0.001 to 5 parts by weight, preferably 0.005 to 2 parts by weight, per 100 parts by weight of the rubber component. When the addition level is lower than the above range, the rate of reaction becomes slow, hence a longer time is required until sufficient crosslinking is attained. On the other hand, at levels exceeding the above range, the effect increases little and the catalyst rather may possibly become a foreign matter in the final products.

Continuous Phase (d) Hydrolyzable Silane Group-containing Thermoplastic Resin

The hydrolyzable silane group-containing thermoplastic resin to be used as the continuous phase in the composition of the present invention gives good moldability and workability to the elastomer. This thermoplastic resin can be postcured by contacting with moisture, preferably after addition of a silanol condensation catalyst and molding.

The elastomer composition of the present invention is characterized by its good moldability and workability as well as by its being at least comparable in rubber elasticity to vulcanized rubbers. For these mutually contradictory features to stand together, it is essential that the base resin of the hydrolyzable silane group-containing thermoplastic resin to serve as the continuous phase be selected from among resins having good compatibility with the ethylene-α-olefin-unconjugated diene copolymer rubber, which is the dispersed phase.

Such a hydrolyzable silane group-containing thermoplastic resin can be readily produced by adding to an organic unsaturated silane and a free radical generator, respectively in specified amounts, to a base resin, followed by melt kneading.

Preferred as such resin are styrenic block copolymers and/or hydrogenation products derived therefrom, styrenic random copolymers and/or hydrogenation products derived therefrom, ethylene-α-olefin copolymers and polyethylene. Among them, noncrystalline polymers such as styrenic block copolymers and/or hydrogenation products derived therefrom, styrenic random copolymers and/or hydrogenation products derived therefrom and ethylene-α-olefin copolymers are preferably used from the viewpoint of low temperature characteristics.

As examples of the styrenic random copolymers, there may be mentioned random copolymers of a vinyl aromatic compound and a conjugated diene compound, and hydrogenation products derived therefrom. More specifically, there may be mentioned styrene-butadiene copolymer rubbers (SBR) and hydrogenated styrene-butadiene copolymer rubbers (HSBR). Particularly for selectively crosslinking the rubber component alone with the SiH group-containing compound, it is preferred that the content of unsaturated bonds in the polymer is as low as possible, hence HSBRs are preferred. Particularly preferred as HSBRs from the moldability viewpoint are those which has a styrene content of 10 to 30% and a MFR of 0.5 to 20 g/10 min, most preferably 1 to 10 g/10 min.

As examples of the styrenic block copolymers, block copolymers consisting of at least one polymer block mainly composed of a vinyl aromatic compound and at least one polymer block mainly composed of a conjugated diene, or hydrogenation products derived therefrom can be used. More specifically, there may be mentioned styrene-butadiene block copolymers, hydrogenated styrene-butadiene block copolymers, styrene-isoprene block copolymers, hydrogenated styrene-isoprene block copolymers and the like. In particular, for selectively crosslinking the rubber component alone with the Si—H group-containing compound, it is preferred that the content of unsaturated bonds in the polymer is as low as possible, hence hydrogenated styrene-butadiene block copolymers, hydrogenated styrene-isoprene block copolymers and the like are preferred. More preferably, hydrogenated styrene-butadiene block copolymers of the multiblock type such as styrene-ethylene-butylene-styrene (SEBS), hydrogenated styrene-isoprene block copolymers of the multiblock type such as styrene-ethylene-propylene-styrene (SEPS), and the like are particularly preferred. Preferred as said SEBS or SEPS are those having the styrene content of 20 to 60% and a MFR of not higher than 160 g/10 min, most preferably not higher than 50 g/10 min. When those having a MFR of 1 or less are used, they are preferably used in an oil-extended form.

The α-olefin in the ethylene-α-olefin copolymers preferably contains 3 to 15 carbon atoms. Preferred specific examples of the α-olefin are propylene, butene-1, pentene-1, octene-1, 4-methylpentene-1, 4-methylhexene-1, 4,4-dimethylpentene-1, nonene-1, decene-1, undecene-1, dodecene-1, 1-tridecene, 1-tetradecene and 1-pentadacene and, from the viewpoint of ready availability and impact resistance improvement, propylene is particularly preferred. Thus, most preferred as the ethylene-α-olefin copolymers to be used in the present invention are ethylene-propylene copolymers.

For lowering the Tg and improving the mechanical strength, it is preferred that the ethylene/propylene composition ratio be 85/15 to 50/50, more preferably 70/30 to 80/20. As for the MFR, those having a MFR of 0.5 to 50 g/10 min are preferred.

As polyethylene, there may be mentioned the high density type (HDPE), medium density type (MDPE), low density type (LDPE), linear low density type (L-LDPE), etc. Among these, LDPE and L-LDPE, which have a soft hardness and a low density, are preferred. Thus, as LDPE, there may be mentioned those having a density of 0.915 to 0.935 g/cm$^3$ and a MFR of 0.1 to 50 g/10 min, more preferably 0.5 to 10 g/10 min, most preferably 1 to 3 g/10 min. As L-LDPE, there may be mentioned those having a density of 0.910 to 0.945 g/cm$^3$ and a MFR of 0.1 to 50 g/10 min, more preferably 0.5 to 10 g/10 min, most preferably 1 to 3 g/10 min. When the MFR of polyethylene is less than the lower limited mentioned above, the extrusion moldability tends to decrease, while a higher MFR than the upper limit tends to lead to a decrease in the degree of crosslinking. When the density of polyethylene is lower than the lower limit mentioned above, the heat resistance tends to decrease, allowing deformation upon heating while, at a higher density than the upper limit, the extrusion moldability tends to become worse in the case of L-LDPE and, in the case of LDPE, industrial scale production becomes difficult. These thermoplastic resins may be used singly or two or more species may be used combinedly.

The unsaturated organic silane is grafted onto the base resin to provides sites for mutual crosslinking of the base resin. Specifically, compounds representable by the general formula RR'SiY$_2$ (where R is a univalent olefinically unsaturated hydrocarbon group, Y is a hydrolyzable organic group and R' is a saturated aliphatic hydrocarbon group or the same as Y) can be used as the unsaturated organic silane. In particular, organic silanes of the general formula RSiY$_3$ (R' being the same as Y) are preferably utilized. More specifically, there may be mentioned vinyltrimethoxysilane, vinyltriethoxysilane, vinyltributoxysilane, allyltrimethoxysilane, allyltriethoxysilane and the like. Among them, vinyltrimethoxysilane is particularly preferred.

The free radical generator serves as an initiator for the silane grafting reaction. The free radical generator to be used in the present invention includes various organic peroxides and peresters, which have potent polymerization initiating activity. For instance, there may be mentioned dicumyl peroxide, α,α'-bis(t-butylperoxydiisopropyl)benzene, di-t-butyl peroxide, t-butylcumyl peroxide, dibenzoyl peroxide, 2,5-dimethyl-2,5-bis(t-butylperoxy)hexane, t-butyl peroxypivalate, t-butyl peroxy-2-ethylhexanoate and the like.

For producing the hydrolyzable silane group-containing thermoplastic resin, 0.1 to 8 parts by weight of the unsaturated organic silane, 0.01 to 0.8 part by weight of the free radical generator are added to 100 parts by weight of the base resin mentioned above. The unsaturated organic silane is preferably used in an amount of 1 to 6 parts by weight and the free radical generator in an amount of 0.05 to 0.5 part by weight. When the level of addition of the unsaturated organic silane is below the lower limit, sufficient grafting cannot take place whereas, levels exceeding the upper limit tend to lead to defective molding and, in addition, are uneconomical. When the level of addition of the free radical generator is below the lower limit, the silane grafting reaction cannot proceed to a. sufficient extent while, at levels exceeding the upper limit, the extrusion moldability tends to decrease and the molding surface tends to become worsened.

In addition to the above production method, the hydrolyzable silane group-containing thermoplastic resin may also be produced as a copolymer of one or more α-monoolefins and a hydrolyzable silane.

Such hydrolyzable silane group-containing thermoplastic resin is used in an amount of 10 to 120 parts by weight, preferably 15 to 70 parts by weight, most preferably 20 to 50) parts by weight, per 100 parts by weight of the copolymer rubber. When the amount exceeds 120 parts by weight, the rubber elasticity of the resulting elastomer composition decreases. When the amount is less than 10 parts, the workability becomes worsened.

Additives

In the practice of the present invention, a paraffinic oil may be added as necessary for the purpose of adjusting the hardness of the resulting composition and providing flexibility. As regards its properties, it is preferred that the paraffinic oil to be used preferably has a kinematic viscosity at 37.8° C. of 20 to 500 cst, a pour point of −10 to −15° C. and a flash point of 170 to 300° C.

The paraffinic oil is preferably used in an amount of 0 to 160 parts by weight, more preferably 20 to 100 parts by weight, per 100 parts by weight of the rubber component. When the amount exceeds 160 parts by weight, the softerning agent tends to bleed out, possibly rendering the final product sticky, and the mechanical properties tend to become worsened.

When necessary, an inorganic filler may also be incorporated into the elastomer composition of the present invention. This inorganic filler not only serves as an extender for enabling product cost reduction but also has an advantage in that it produces positive effects on quality improvements (providing heat resistant shape retention, flame resistance and other properties). Such inorganic filler includes, for example, calcium carbonate, carbon black, talc, magnesium hydroxide, mica, barium sulfate, natural silicic acid, synthetic silicic acid (white carbon), titanium oxide and the like. Usable as carbon black are channel black, furnace black, etc. Among these inorganic fillers, talc and calcium carbonate are economically advantageous, hence preferred.

Furthermore, various other additives may be added where necessary. As examples of such additives, there may be mentioned nucleating agents, external lubricant, internal lubricants, hindered amine light stabilizers, hindered phenol antioxidants, colorants, flame retardants, and silicone oils (organosiloxanes, silane coupling agents, etc.). It is also possible to blend other thermoplastic resins such as polypropylene and thermoplastic urethane resins, and various compatibility improving agents.

Dynamic Heat Treatment

For mixing the above-mentioned rubber component, hydrolyzable silane group-containing thermoplastic resin, silicone crosslinking agent (having two or more SiH groups) and hydrosilylation catalyst and subjecting the mixture to dynamic heat treatment, any of the known methods used in the production of ordinary resin compositions and rubber compositions may be employed. Essentially, the dynamic heat treatment is mechanical melt kneading and, for such treatment, any of single-screw extruders, twin-screw extruders, Bunbury mixers, various kneaders, Brabender mixers, rolls and the like can be used. The order of addition of the components in the dynamic heat: treatment is not critical. Thus, for example, it is possible to preliminarily mixing the rubber and resin components in a Henschel mixer, blender or like mixing apparatus and melt knead the mixture in a kneading apparatus such as mentioned above, then add the crosslinking agent and catalyst components and carry out the dynamic crosslinking. In cases where the scorching time of the rubber to be used is sufficiently long, a loading process may be employed which comprises, for example, melt kneading all the components other than the catalyst in advance and then adding the hydrosilylation catalyst, followed by further melt kneading.

The melt kneading temperature may suitably be selected within the range of 180 to 300° C., and the shear rate within the range of 100 to 5,000/sec. In particular, for attaining high level dispersion of the rubber, it is desirable to carry out the melt kneading in a twin-screw kneader having a clearance of 1.0 to 5.5 mm with the screws rotating in different directions at a very high tip speed of 150 to 500 m/min.

Molding and Crosslinking with Water

A silanol condensation catalyst is preferably added to the composition resulting from the melt kneading and dynamic heat treatment in the steps mentioned above. Generally, the use of such catalyst makes it possible to attain a practical rate of reaction in the crosslinking reaction with water.

As the silanol condensation catalyst to be used here, there may be Unmentioned organometallic compounds such as dibutyltin dilaurate, stannous acetate, dibutyltin diacetate, dibutyltin dioctoate, lead naphthenate, zinc caprylate, cobalt naphthenate, tetrabutyl titanale, lead stearate, zinc stearate, cadmium stearate, barium stearate, calcium stearate, etc.

The level of addition of the silanol condensation catalyst is 0.001 to 3 parts by weight, preferably 0.005 to 1 part by weight, per 100 parts by weight of the hydrolyzable silane group-containing thermoplastic resin. When the amount of the silanol condensation catalyst is smaller than 0.001 part by weight, the crosslinking cannot proceed to a sufficient extent. When it exceeds 3 parts by weight, the curing tends to proceed locally, worsening the appearance.

For adding the silanol condensation catalyst, any of the known conventional methods may be employed. For instance, it may be added as it is, or may be added in a form diluted with a master batch with the resin or with a solvent, or in a form carried on a filler.

The composition with the silanol condensation catalyst added as necessary can be molded, after sufficient dry blending, to a desired shape or form using a per se known molding machine for thermoplastic resins. Such molding can be carried out by various methods, such as -injection molding, extrusion molding, calender molding and blow molding.

When the thus-molded elastomer composition is contacted with water, the hydrolyzable silane group-containing thermoplastic resin undergoes crosslinking with water and the continuous phase is cured. For effecting the crosslinking with moisture, immersion is carried out in warm or hot water for an appropriate period. For instance, the composition is immersed in warm water at about 60° C. for about 24 hours, or in boiling water at 100° C. for about 2 hours. The method comprising allowing the composition to stand in a room filled with steam for about 2 hours or other appropriate methods can also be selected. The thus-obtained molded elastomer composition shows excellent rubber characteristics even at high temperatures.

EXAMPLES

The following working examples and comparative examples illustrate the present invention in further detail. They are, however, by no means limitative of the scope of the present invention. In the following, the hydrolyzable silane group-containing thermoplastic resin obtained by silane grafting of the base resin is referred to as silane graftomer. The components used in the examples and comparative examples were as listed below.

Ethylene-α-olefin-unconjugated Diene Copolymer Rubber

<EPDM (1)>

Ethylene-propylene-ethylidenenorbornene Copolymer Rubber

Keltan K712, product of Idemitsu DSM Co. [propylene content: 40% by weight, Mooney viscosity $ML_{1+4}(125° C.)$: 63, iodine value: 16]

<EPDM (2)>

Ethylene-propylene-ethylidenenorbornene Copolymer Rubber

EP43, product of Japan Synthetic Rubber Co. [propylene content: 43% by weight, Mooney viscosity $ML_{1+4}(100° C.)$: 47, iodine value: 6]

Rubber Crosslinkins Agent
<Crosslinking Agent (1)>
Product of Nippon Unicar

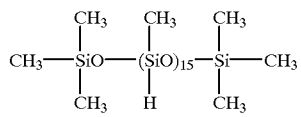

<Crosslinking Agent (2)>
Product of Nippon Unicar

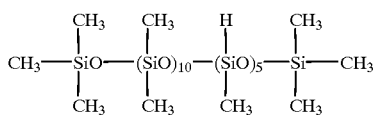

<Crosslinking Agent (3)>
Product of Nippon Unicar

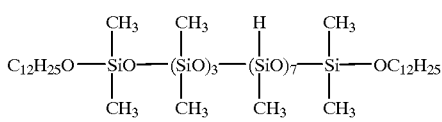

<Crosslinking Agent (4)>
A sulfur-containing crosslinking agent (described in Japanese Kokai Tokkyo Koho H01-236250) which is a mixture of 100 parts of tetramethylthiuram disulfide and 26 parts of sulfur.
Hydrosilylation Catalyst
<Supported Catalyst (1)>
The catalyst #as prepared by preparing a 3% by weight solution of chloroplatinic acid hexahydrate (product of Yasuda Yakuhin Co.) in 2-propanol and causing 10 g of the solution to be supported on 100 g of colloidal silica (product of Nippon Aerosil, Aerosil 200).
<Rhodium Catalyst (2)>
The catalyst was prepared by melt kneading 1 g of biscyclooctadiene rhodium salt with 500 g of low-density polyethylene (specific gravity 0.923).
Hydrolyzable Silane Group-containing Thermoplastic Resin
<Silane Graftomer (1)>
Six weight parts of vinyltrimethoxysilane and 0.1 weight part of dicumyl peroxide were thoroughly admixed with 100 weight parts of hydrogenated poly(styrene-butadiene) block copolymer Tuftec H1041, product of Asahi Chemical Industry Co. [styrene content: 30% by weight, MFR (230° C.)=5.0 g/10 min] and the mixture was kneaded in an extruder at an extrusion temperature of 200–250° C., followed by strand cutting to give pellets of a silane graftomer.
<Silane Graftomer (1)>
Four weight parts of vinyltrimethoxysilane and 0.1 weight part of dicumyl peroxide were thoroughly admixed with 100 weight. parts of hydrogenated poly(styrene-butadiene) block copolymer Tuftec H1052, product of Asahi Chemical Industry Co. [styrene content: 30% by weight, MFR (230° C.) 12 g 10 min] and the mixture was kneaded in an extruder at an extrusion temperature of 200–250° C., followed by strand cutting to give pellets of a silane graftomer.
<Silane Graftomer (2)>
Four weight parts of vinyltrimethoxysilane and 0.15 weight part of dicumyl peroxide were thoroughly admixed with 100 weight parts of hydrogenated styrene-butadiene random copolymer Dynaron 1320P, product of Japan Synthetic Rubber Co. [styrene content: 10% by weight, MFR (230° C.)=3.5 g/10 min] and the mixture was kneaded in an extruder at an extrusion temperature of 200–250° C., followed by strand cutting to give pellets of a silane graftomer.
<Silane Graftomer (2)>
Four weight parts of vinyltrimethoxysilane and 0.1 weight part of dicumyl peroxide were thoroughly admixed with 100 weight parts of hydrogenated styrene-butadiene random copolymer Dynaron 1910P, product of Japan Synthetic Rubber Co. [styrene content: 30% by weight, MFR (230° C.)=5.3 g/10 min] and the mixture was kneaded in an extruder at an extrusion temperature of 200–250° C., followed by strand cutting to give pellets of a silane graftomer.
<Silane Graftomer (3)>
Two weight parts of vinyltrimethoxysilane and 0.1 weight part of dicumyl peroxide were thoroughly admixed with 100 weight parts of ethylene-propylene copolymer EP07P, product of Japan Synthetic Rubber Co. [MFR (230° C.)=0.7 g/10 min] and the mixture was kneaded in an extruder at an extrusion temperature of 200–250° C., followed by strand cutting to give pellets of a silane graftomer.
<Silane Graftomer (4)>
Two weight parts of vinyltriethoxysilane and 0.15 weight part of dicumyl peroxide were thoroughly admixed with 100 weight parts of low-density polyethylene resin NUC9025, product of Nippon Unicar Co. [MFR (230° C.)=3.2 g/10 min, density 0.957 g/cm$^3$] and the mixture was kneaded in an extruder at an extrusion temperature of 200–250° C., followed by strand cutting to give pellets of a silane graftomer.
<Silane Copolymer (1)>
Ethylene-hiydrolyzable silane copolymer: Linklon HE-700N, product of Mitsubishi Chemical Corp.
Other Components
<PP>
Polypropylene resin W501, product of Sumitomo Chemical Co. [MFR (230° C.)=3.1 g/10 min].
<Oil>
Diana process oil PW-380, product of Idemitsu Kosan Co. [paraffin-based process oil, kinematic viscosity: 381.6 cst (40° C.), 30.1 (100° C.), average molecular weight 746, ring analysis data: CA=0%, CN=27%, CP=73%].
<Condensation Catalyst (Silanol Condensation Catalyst)>
Dibutyltin dilaurate.

Examples 1 to 12

Of the components specified in Table 1 and Table 2 for each example, those components other than the hydrosilylation catalyst and silanol condensation catalyst were thoroughly dry-blended. Then, this mixture was melt-kneaded in a kneader at about 200° C. for 20 minutes to give a roll sheet. This roll sheet was cooled to room temperature and pelletized using a sheet pelletizer to give a thermoplastic composition to be submitted to dynamic crosslinking. The hydrosilylation catalyst specified in Table 1 or Table 2 was added to the pellets and the mixture was kneaded using a twin-screw kneader at a shear rate of 800/sec for attaining sufficient plasticization according to the base resin (resin temperature: 190–230° C.) to give a water-curable elastomer composition. Thereafter, the silanol condensation catalyst was added and injection molding was carried out using the resulting mixture. The moldings were treated in warm water at 80° C. for 3 hours to thereby promote crosslinking and evaluated for the physical properties mentioned below under (1) to (4). Separately, the silanol condensation catalyst was added to the water-curable elastomer composition, the mixture was subjected to extrusion molding and the moldings were treated in warm water at 80° C. for 3 hours and evaluated for moldability by the method described below under (5).

Comparative Examples 1 to 8

In Comparative Examples 1 to 4, elastomer compositions (incapable of being crosslinked with water) were produced in the same manner as in the above examples except that polypropylene was used as the continuous phase, as described in U.S. Pat. No. 4,803,244, in lieu of the silane graftomer. In Comparative Examples 5 to 8, elastomer compositions were produced in the same manner as in the examples except that the tetramethylthiuram disulfide-sulfur mixture was used as the crosslinking agent.

The evaluation items for the elastomers obtained were as follows:
(1) Hardness (JIS K 6301 type A).
(2) Compression set CS [%] (JIS K 6301, 25% compression, 70° C.×100 HR, 25° C.×100 HR)
(3) Low temperature impact resistance Test specimens, 75×75×t 1 in size, were immersed in a dry ice-methanol solution at −60° C. for 10 minutes and then subjected to du Pont type falling ball impact testing. The test was repeated 5 times and the number of those tests in which no cracking occurred out of the 5 tests was described in each table. [Test conditions: weight of the weight: 500 g, front ball R: 3/16, drop height: 1 m].

(4) Oil resistance [%] (JIS K 6301; using No. 3 test oil (lubricating oil), test specimens, 50×50×t 2, were immersed therein at 70° C. for 2 hours, and the change in weight between the weight before immersion and that after immersion was determined.)

(5) Moldability (Tapes, 150×500 mm in size, were prepared using a ø 50 mm extruder using a screw with L/D=20 and a 100 mm×t 0.5 die at C/R=3.0, a kneading temperature of 200° C. and a number of revolutions of 100 rpm and superficially observed by the eye; when 10 or more spits having a diameter of 100 microns or larger were observed, the moldability was judged as x, when 2 to 9 such spits were observed, as, and when one or no spit was observed, as o.)

As is evident from Tables 1 to 4 shown below, the elastomer compositions of the present invention are excellent in rubber elasticity at high temperatures, low temperature impact resistance and oil resistance and at the same time have good moldability.

TABLE 1

| | Example | 1 | 2 | 3 | 4 | 5 | 6 |
|---|---|---|---|---|---|---|---|
| Composition, parts by weight | EPDM (1) | 100 | 0 | 100 | 0 | 0 | 100 |
| | EPDM (2) | 0 | 100 | 0 | 100 | 100 | 0 |
| | Silane graftomer (1) | 25 | 0 | 0 | 0 | 0 | 50 |
| | Silane graftomer (2) | 0 | 50 | 0 | 0 | 0 | 0 |
| | Silane graftomer (3) | 0 | 0 | 100 | 0 | 0 | 0 |
| | Silane graftomer (4) | 0 | 0 | 0 | 43 | 0 | 0 |
| | Silane copolymer (1) | 0 | 0 | 0 | 0 | 67 | 0 |
| | Crosslinking agent (1) | 7 | 0 | 0 | 0 | 3 | 0 |
| | Crosslinking agent (2) | 0 | 1 | 0 | 15 | 0 | 7 |
| | Crosslinking agent (3) | 0 | 0 | 28 | 0 | 0 | 0 |
| | Supported catalyst (1) | 1 | 0 | 0 | 7 | 0 | 3 |
| | Rhodium catalyst (2) | 0 | 3 | 7 | 0 | 1 | 0 |
| | Oil | 0 | 0 | 0 | 0 | 20 | 70 |
| | Condensation catalyst | 0.1 | 0.1 | 0.1 | 0.1 | 0.1 | 0.1 |
| Physical properties | Hardness | 55 | 65 | 80 | 67 | 75 | 55 |
| | CS (%) 25° C. | 17 | 20 | 21 | 19 | 22 | 13 |
| | CS (%) 70° C. | 21 | 26 | 28 | 26 | 27 | 17 |
| | Low temperature impact resistance | 5 | 5 | 5 | 5 | 5 | 5 |
| | Oil resistance (%) | 9 | 15 | 10 | 10 | 10 | 9 |
| | Moldability | o | o | o | o | o | o |

TABLE 2

| | Example | 7 | 8 | 9 | 10 | 11 | 12 |
|---|---|---|---|---|---|---|---|
| Composition, parts by weight | EPDM (1) | 100 | 0 | 100 | 0 | 0 | 100 |
| | EPDM (2) | 0 | 100 | 0 | 100 | 100 | 0 |
| | Silane graftomer (1)' | 50 | 0 | 0 | 0 | 0 | 0 |
| | Silane graftomer (2)' | 0 | 50 | 0 | 0 | 0 | 0 |
| | Silane graftomer (3) | 0 | 0 | 50 | 0 | 0 | 0 |
| | Silane graftomer (4) | 0 | 0 | 0 | 50 | 0 | 50 |
| | Silane copolymer (1) | 0 | 0 | 0 | 0 | 50 | 0 |
| | Crosslinking agent (1) | 7 | 7 | 7 | 7 | 7 | 0 |
| | Crosslinking agent (2) | 0 | 0 | 0 | 0 | 0 | 0 |
| | Crosslinking agent (3) | 0 | 0 | 0 | 0 | 0 | 7 |
| | Supported catalyst (1) | 7 | 0 | 0 | 0 | 7 | 7 |
| | Rhodium catalyst (2) | 0 | 7 | 7 | 7 | 0 | 0 |
| | Oil | 0 | 0 | 0 | 0 | 0 | 0 |
| | Condensation catalyst | 0.1 | 0.1 | 0.1 | 0.1 | 0.1 | 0.1 |
| Physical properties | Hardness | 62 | 63 | 63 | 68 | 67 | 67 |
| | CS (%) 25° C. | 17 | 18 | 18 | 16 | 17 | 21 |
| | CS (%) 70° C. | 23 | 18 | 24 | 22 | 23 | 28 |
| | Low temperature impact resistance | 5 | 5 | 5 | 5 | 5 | 5 |

TABLE 2-continued

| Example | 7 | 8 | 9 | 10 | 11 | 12 |
|---|---|---|---|---|---|---|
| Oil resistance (%) | 10 | 11 | 10 | 9 | 9 | 9 |
| Moldability | o | o | o | o | o | o |

TABLE 3

| | Comparative Example | 1 | 2 | 3 | 4 |
|---|---|---|---|---|---|
| Composition, parts by weight | EPDM (1) | 100 | 0 | 0 | 100 |
| | EPDM (2) | 0 | 100 | 100 | 0 |
| | PP | 50 | 50 | 50 | 50 |
| | Crosslinking agent (1) | 0 | 0 | 0 | 0 |
| | Crosslinking agent (3) | 28 | 7 | 7 | 28 |
| | Supported catalyst (1) | 7 | 0 | 0 | 0 |
| | Rhodium catalyst (2) | 0 | 7 | 7 | 7 |
| | Oil | 20 | 100 | 0 | 0 |
| Physical properties | Hardness | 80 | 64 | 97 | 98 |
| | CS (%) 25° C. | 24 | 23 | 25 | 26 |
| | CS (%) 70° C. | 32 | 31 | 36 | 35 |
| | Low temperature impact resistance | 0 | 1 | 0 | 0 |
| | Oil resistance (%) | 15 | 16 | 18 | 19 |
| | Moldability | o | o | o | o |

TABLE 4

| | Comparative Example | 5 | 6 | 7 | 8 |
|---|---|---|---|---|---|
| Composition, parts by weight | EPDM (1) | 100 | 0 | 0 | 100 |
| | EPDM (2) | 0 | 100 | 100 | 0 |
| | Silane graftomer (4) | 25 | 50 | 0 | 0 |
| | Silane copolymer (1) | 0 | 0 | 100 | 50 |
| | Crosslinking agent (4) | 3.5 | 3.5 | 3.5 | 3.5 |
| | Oil | 0 | 0 | 0 | 70 |
| | Condensation catalyst | 0.1 | 0.1 | 0.1 | 0.1 |
| Physical properties | Hardness | 50 | 62 | 80 | 50 |
| | CS (%) 25° C. | 35 | 39 | 45 | 38 |
| | CS (%) 70° C. | 48 | 57 | 67 | 49 |
| | Low temperature impact resistance | 0 | 0 | 0 | 0 |
| | Oil resistance (%) | 10 | 14 | 10 | 13 |
| | Moldability | x | x | x | x | claim:

1. A moisture-curable elastomer composition obtained by dynamic heat treatment of a mixture comprising
   (a) an ethylene-α-olefin-unconjugated diene copolymer rubber,
   (b) a silicon-based crosslinking agent having two or more SiH groups within the molecule,
   (c) a hydrosilylation catalyst and
   (d) a hydrolyzable silane group-containing thermoplastic resin.

2. A process for producing moisture-curable elastomer compositions which comprises the step of blending
   (a) an ethylene-α-olefin-unconjugated diene copolymer rubber,
   (b) a silicon-based crosslinking agent having two or more SiH groups within the molecule,
   (c) a hydrosilylation catalyst and
   (d) a hydrolyzable silane group-containing thermoplastic resin, and the step of subjecting the resulting mixture to dynamic heat treatment.

3. An elastomer composition resulting from molding of the elastomer composition of claim 1, followed by contacting with water to thereby effect crosslinking of the hydrolyzable silane group-containing thermoplastic resin.

4. The elastomer composition of claim 3, wherein the crosslinking of the hydrolyzable silane group-containing thermoplastic resin has been carried out in the presence of a silanol condensation catalyst.

5. The elastomer composition of claim 1 or 3, wherein the ethylene-α-olefin-unconjugated diene copolymer rubber is an ethylene-propylene-ethylidene-norbornene copolymer rubber.

6. The elastomer composition of claim 1 or 3, wherein the silicon-based crosslinking agent having two or more SiH groups within the molecule, is an organohydrogensiloxane.

7. The elastomer composition of claim 1 or 3, wherein the hydrosilylation catalyst is supported on a solid component.

8. The elastomer composition of claim 1 or 3, wherein the hydrolyzable silane group-containing thermoplastic resin is a silane graftomer obtained by reacting a thermoplastic resin with an unsaturated organic silane and a free radical generator.

9. The elastomer composition of claim 8, wherein the thermoplastic resin comprises a styrenic block copolymer and/or a styrenic random copolymer.

10. The elastomer composition of claim 9, wherein the styrenic block copolymer is a hydrogenated styrene-butadiene block copolymer.

11. The elastomer composition of claim 9, wherein the styrenic random copolymer is a hydrogenated styrene-butadiene copolymer rubber.

12. The elastomer composition of claim 8, wherein the thermoplastic resin is an ethylene-α-olefin copolymer.

13. The elastomer composition of claim 8, wherein the thermoplastic resin is polyethylene.

* * * * *